US011809229B2

(12) United States Patent
Roose

(10) Patent No.: US 11,809,229 B2
(45) Date of Patent: Nov. 7, 2023

(54) MANAGING DOCKING STATIONS

(71) Applicant: SYNAPTICS INCORPORATED, San Jose, CA (US)

(72) Inventor: William George Roose, Ely (GB)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 17/152,755

(22) Filed: Jan. 19, 2021

(65) Prior Publication Data
US 2022/0229468 A1    Jul. 21, 2022

(51) Int. Cl.
*G06F 1/16* (2006.01)
*G06F 13/38* (2006.01)
*G06F 15/78* (2006.01)

(52) U.S. Cl.
CPC ............ *G06F 1/1632* (2013.01); *G06F 1/166* (2013.01); *G06F 1/1637* (2013.01); *G06F 13/385* (2013.01); *G06F 15/7871* (2013.01)

(58) Field of Classification Search
CPC .. G06F 13/385; G06F 15/7871; G06F 1/1632; G06F 1/1637; G06F 1/166; G06F 1/385; G06F 1/7871
See application file for complete search history.

(56) References Cited

U.S. PATENT DOCUMENTS

| | | | | |
|---|---|---|---|---|
| 9,026,709 B2* | 5/2015 | Reeves | ................... | G06F 9/541 |
| | | | | 713/2 |
| 10,903,710 B2* | 1/2021 | Mura | ..................... | H01B 13/00 |
| 11,004,422 B1* | 5/2021 | Bull | ..................... | G06F 16/9577 |
| 2008/0252419 A1* | 10/2008 | Batchelor | ........... | H04W 12/084 |
| | | | | 340/10.1 |
| 2010/0256823 A1* | 10/2010 | Cherukuri | ........... | H04L 12/2827 |
| | | | | 709/224 |
| 2010/0268831 A1* | 10/2010 | Scott | ..................... | H04L 69/329 |
| | | | | 709/228 |
| 2012/0155321 A1* | 6/2012 | Yang | ..................... | H04W 24/04 |
| | | | | 370/254 |
| 2012/0324135 A1 | 12/2012 | Goodman et al. | | |

(Continued)

FOREIGN PATENT DOCUMENTS

GB    2584408 A    12/2020

OTHER PUBLICATIONS

UK Combined Search and Examination Report from GB2200605.0, dated Aug. 30, 2022, 1-11 pages.

*Primary Examiner* — Henry Tsai
*Assistant Examiner* — Aurangzeb Hassan
(74) *Attorney, Agent, or Firm* — Paradice & Li LLP

(57) ABSTRACT

A setting to be applied at a docking station is obtained, either from a memory of the docking station, or from another device connected to a network by first obtaining, from a user device connected to the docking station, an identity of the user device and/or an identity of a user of the user device. Based on the identity of the user and/or the user device, a configuration set, of a plurality of configuration sets, that identifies at least one setting to be applied at the docking station is obtained and a setting to apply at the docking station is determined based at least partly on the configuration set. The docking station may store a set of docking station specific settings which can be used in conjunction with the setting(s) determined from the configuration set.

15 Claims, 14 Drawing Sheets

(56) References Cited

U.S. PATENT DOCUMENTS

| | | | |
|---|---|---|---|
| 2013/0139154 A1* | 5/2013 | Shah | G06F 9/45558 |
| | | | 718/1 |
| 2014/0206436 A1* | 7/2014 | French | G07F 17/3244 |
| | | | 463/25 |
| 2015/0011160 A1 | 1/2015 | Jurgovan et al. | |
| 2015/0020189 A1* | 1/2015 | Soffer | H01R 13/6397 |
| | | | 726/16 |
| 2018/0136705 A1* | 5/2018 | Obie | G06F 1/266 |
| 2019/0064879 A1* | 2/2019 | Jeansonne | G06F 13/385 |

* cited by examiner

Figure 3A

| Set U1 | |
|---|---|
| Device | Configuration |
| Network | Internal User |
| Display 1 | Left |
| Display 2 | Middle |
| Webcam | Off |
| Headphones | Volume 10% |
| Speakers | Off |
| Microphone | Off |
| Keyboard | QWERTY |
| Mouse | On |
| Joystick | On |
| Applications | None |

Figure 3B

| Set U2 | |
|---|---|
| Device | Configuration |
| Network | Internal User |
| Display 1 | Left |
| Display 2 | Right |
| Webcam | Off |
| Headphones | Volume 50% |
| Speakers | Off |
| Microphone | Off |
| Keyboard | QWERTY |
| Mouse | Off |
| Joystick | On |
| Applications | Calendar: Display 1 |

Figure 3C

| Set U3 | |
|---|---|
| Device | Configuration |
| Network | External User |
| Display 1 | Middle |
| Display 2 | Right |
| Webcam | Off |
| Headphones | Off |
| Speakers | Off |
| Microphone | Off |
| Keyboard | DVORAK |
| Mouse | On |
| Joystick | Off |
| Applications | Email: Display 1<br>Word Process: Display 2 |

Figure 3D

| Set U4 | |
|---|---|
| Device | Configuration |
| Network | External User |
| Display 1 | Left |
| Display 2 | Right |
| Webcam | Off |
| Headphones | Volume 50% |
| Speakers | Off |
| Microphone | Off |
| Keyboard | DVORAK |
| Mouse | On |
| Joystick | Off |
| Applications | None |

Figure 4

| User | Device | Configuration Set |
|---|---|---|
| Anne | Anne's Laptop | Set U1 |
| Anne | Anne's Tablet | Set U2 |
| Beth | Beth's Laptop | Set U3 |
| Beth | Beth's Tablet | Set U4 |
| Anne | Shared Terminal | Set U1 |
| Beth | Shared Terminal | Set U4 |

Figure 5

| User ID | Configuration Set |
|---------|-------------------|
| U1001   | Set U1            |
| U1002   | Set U3            |
| U1003   | Set U4            |
| U1004   | Set U2            |

Figure 6

| Device ID | Configuration Set |
|---|---|
| D2001 | Set U1 |
| D2002 | Set U2 |
| D2003 | Set U3 |
| D2004 | Set U4 |
| D2005 | Set U1 |

Figure 7A

| Set D1 | |
|---|---|
| Device | Configuration |
| Display 1 | Left |
| Display 2 | Right |
| Desk Height | 51 |
| Desk Light | Off |
| Blinds | Open 00:00 – 10:00<br>Closed 10:00 – 15:00<br>Open 15:00 – 00:00 |
| Climate Control | 15°C 00:00 – 08:00<br>20°C 08:00 – 19:00<br>15°C 19:00 – 00:00 |

Figure 7B

| Set D2 | |
|---|---|
| Device | Configuration |
| Display 1 | Left |
| Display 2 | Right |
| Desk Height | 80 |
| Desk Light | On |
| Blinds | Closed |
| Climate Control | 15°C - adjustable |

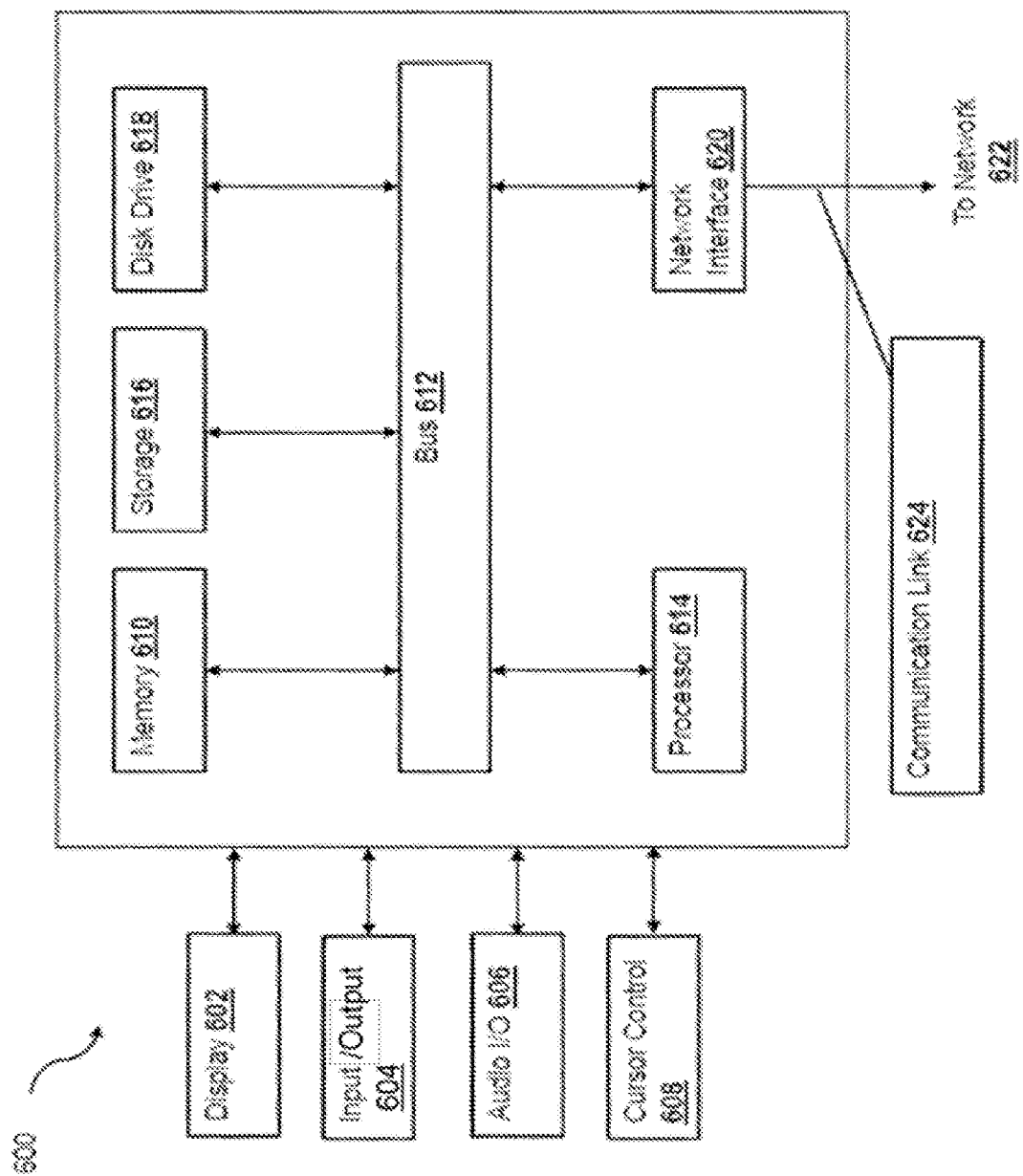

MANAGING DOCKING STATIONS

BACKGROUND

With the increasing popularity of remote working, it is becoming more common for offices and other working spaces to use so-called "hotdesking" systems in which, rather than each user being assigned their own dedicated workstation, multiple workstations with docking systems and peripherals that can be used by any user are provided. Many other spaces, such as cafes and libraries, are also beginning to use similar technology to allow users to temporarily use a place to connect their own devices and to use local hardware such as display devices and printers.

In such systems each user does not have their own dedicated workstation configured according to their preferences, thus it is common for users to reconfigure each new workstation when they connect. This leads to frustration and wasted time.

SUMMARY

This Summary is provided to introduce in a simplified form a selection of concepts that are further described below in the Detailed Description. This Summary is not intended to identify key features or essential features of the claims subject matter, nor is it intended to limit the scope of the claimed subject matter.

A method of determining a setting to apply at a docking station is disclosed. The docking station has a plurality of adjustable parameters associated with an operation and configurable for an individual user of a user device connected to the docking station. In one embodiment, the method comprises obtaining, from a user device connected to the docking station, device identity information indicating an identity of the user device and/or user identity information indicating an identity of a user of the user device; obtaining, based on the user identity information and/or the device identity information, a configuration set, from a plurality of stored configuration sets, the configuration set identifying at least one setting relating to the plurality of adjustable parameters associated with operation of the docking station to be applied at the docking station; and determining the setting to apply at the docking station based at least partly on the obtained configuration set.

In some embodiments, the docking station may store a set of docking station specific settings that is associated with the docking station; and the determining a setting to apply at the docking station may be based at least partly on a comparison of the obtained configuration set with the set of docking station specific settings that is associated with the docking station.

In some embodiments, the docking station may obtain information regarding hardware available at the docking station and/or a network connection available at the docking station. The determination of a setting to apply at the docking station may be based at least partly on the hardware available at the docking station and/or the network connection available at the docking station.

In some embodiments, the set of docking station specific settings that is associated with the docking station may comprise at least one of: a height setting of a height-adjustable desk; a temperature setting for a climate control unit; a display setting that defines a logical arrangement of displays; a window blind setting; or a lighting setting.

In some embodiments, the configuration set may comprise a setting that defines at least one of: a size or arrangement of an application window; a logical arrangement of display panels; a brightness or contrast of a display panel; a configuration setting for an audio input device; a configuration setting for an audio output device; a configuration setting for a keyboard; a configuration setting for a mouse; a network configuration setting; or a network security setting. The setting may define the logical arrangement of display panels and include a display panel of the user device connected to the docking station.

In some embodiments, the docking station may receive, from the user device, a request to change a setting at the docking station; and if it is determined that the request to change a setting should be granted, then the docking station: performs the requested setting change; generates an updated configuration set; and either stores the updated configuration set in association with the identity of the user device and/or the identity of the user of the user device at the docking station or transmits the updated configuration set to another device for storage thereon.

In some embodiments, the docking station has a plurality of adjustable parameters associated with operation thereof and configurable for an individual user of a user device connected to the docking station.

In an embodiment, the method may comprise: storing, at a device connected to a network, a plurality of configuration sets that each identify at least one setting relating to the plurality of adjustable parameters associated with operation of the docking station to be applied at the docking station; receiving, at the device from a docking station connected to the network, device identity information indicating an identity of a user device connected to the docking station and/or user identity information indicating an identity of a user of the user device; determining whether the plurality of configuration sets includes a configuration set that is associated with the identity of the user device indicated by the device identity information and/or the identity of the user indicated by the user identity information; and if it is determined that the plurality of configuration sets includes the configuration set that is associated with the identity of the user device indicated by the device identity information and/or the identity of the user indicated by the user identity information, transmitting the configuration set that is associated with the identity of the user device indicated by the device identity information and/or the identity of the user indicated by the user identity information to the docking station to be applied at the docking station.

In some embodiments, the method may further comprise: if it is determined that the plurality of configuration sets does not include a configuration set that is associated with both the identity of the user device indicated by the device identity information and the identity of the user indicated by the user identity information, determining whether the plurality of configuration sets includes a configuration set that is associated with the user indicated by the user identity information but is not associated with the identity of the user device indicated by the device identity information; if it is determined that the plurality of configuration sets includes only one configuration set that is associated with the user indicated by the user identity information but is not associated with the identity of the user device indicated by the device identity information, transmitting the configuration set that is associated with the user indicated by the user identity information but is not associated with the identity of the user device indicated by the device identity information to the docking station to be applied at the docking station; and if it is determined that the plurality of configuration sets includes a plurality of configuration sets that are associated with the user indicated by the user identity information but are not associated with the identity of the user device indicated by the device identity information, generating a combined configuration set using the plurality of configuration sets that are associated with the user indicated by the user identity information but are not associated with the identity of the user device indicated by the device identity information, and transmitting the combined configuration set to the docking station to be applied at the docking station.

In some embodiments, generation of the combined configuration set may comprise calculating an average value of a numerical setting of the plurality of configuration sets that are associated with the user indicated by the user identity information but are not associated with the identity of the user device indicated by the device identity information.

In one embodiment, a method for storing user configurations in a hotdesking system, may comprise: a client device connected to a docking station which is part of a network of docking stations; the user of the client device modifying docking settings; the docking station proliferating the modified docking settings through the network; the client device connecting to a different docking station on the network of docking stations; the docking station identifying the user and/or client device; the docking station retrieving the previously-proliferated settings; the docking station determining appropriate configurations and applies them to its behaviour.

In some embodiments, the appropriate configurations determined and applied by the docking station may be dependent on peripheral devices and other hardware constraints at the docking station. For example, audio configuration will not be relevant to a docking station with no audio capabilities.

In some embodiments, the configurations may include: Screen position (for example, where there are two display panels connected to the docking station, the operating system of the client device may logically position these above an internal screen of the client device docked to the docking station in a logical arrangement of the displays); Preferred audio output settings and devices (for example, sound being muted unless the client device is connected to a docking station with a headset connected); Preferred audio input settings and devices (for example, use of an internal device microphone or an external peripheral microphone); and Preferred screens and locations for particular user applications (for example, a user may prefer to always have an email application open on the left-most screen). It will be appreciated that any other suitable configuration may be applied at a docking station.

Beneficially, some examples reduce the need for manual configuration of settings when a user connects their client device to a docking station on the network, thus saving time. Moreover, some examples also enable a network administrator to perform configuration for a client device once and then no further configuration changes need be performed. Beneficially, therefore, users who are not familiar with the process of changing device configurations need not carry out such changes.

BRIEF DESCRIPTION OF THE DRAWINGS

The present embodiments are illustrated by way of example and are not intended to be limited by the figures of the accompanying drawings.

FIGS. 3A to 3D show example Configuration Sets;
FIG. 4 shows example mappings between users, devices, and Configuration Sets;
FIG. 5 shows example mappings between user IDs and Configuration Sets;
FIG. 6 shows example mappings between device IDs and Configuration Sets;
FIGS. 7A and 7B show example Dock Configuration Sets;
FIG. 11 shows a block diagram of an example computer system.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

Figure 1:
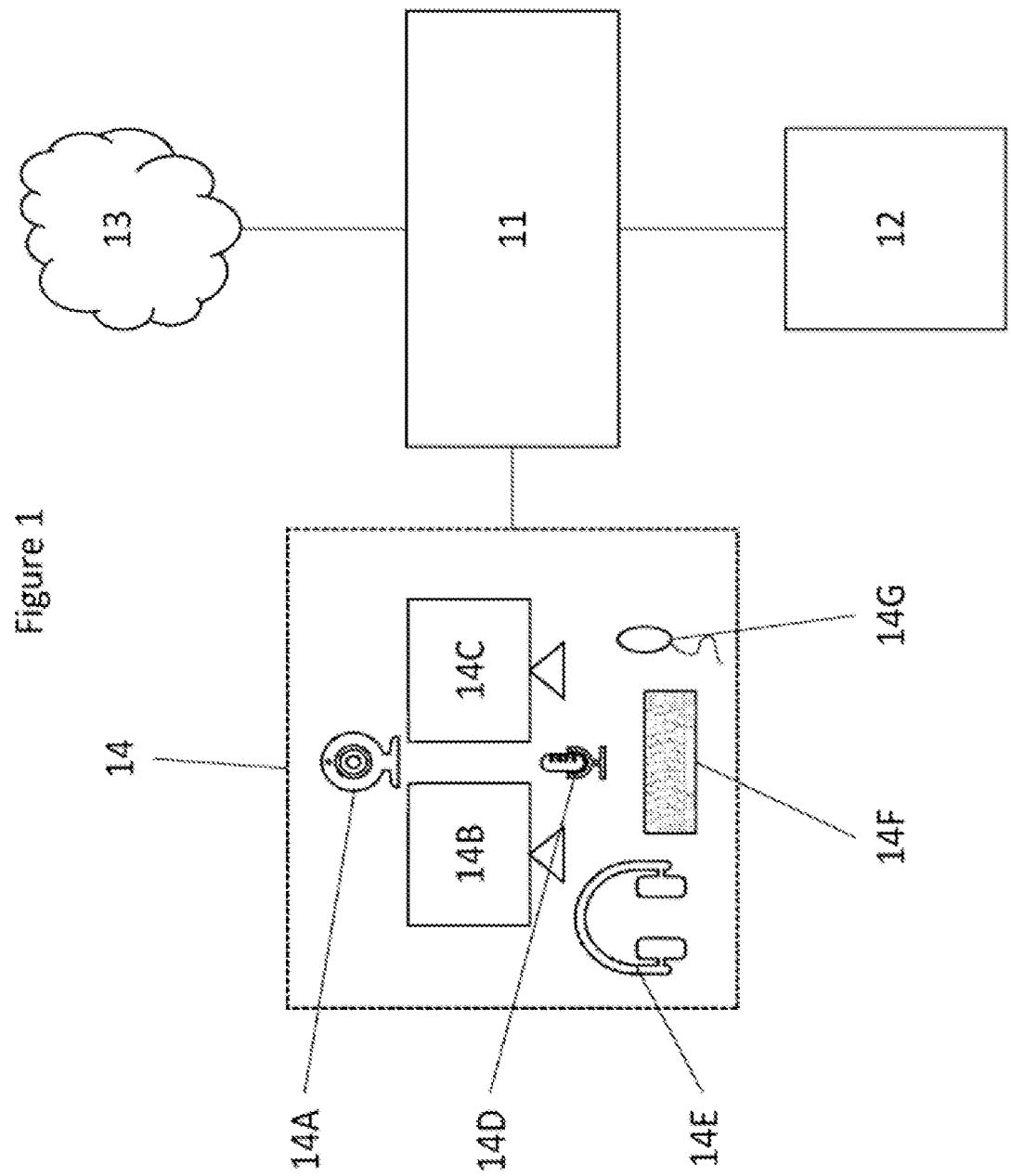
FIG. 1 shows a desktop arrangement.

FIG. 1 shows a desktop arrangement comprising a docking station 11 connected to a plurality of peripheral devices 14, a client device 12 (such as a computing device), and a network 13. The peripheral devices 14, in this example, include a camera (e.g., a webcam 14A), one or more displays (such as two display panels 14B and 14C), a microphone 14D, a listening device (e.g., a pair of headphones 14E or a loudspeaker), a keyboard 14F, and a pointing device (such as a mouse 14G). While this example set of peripheral devices will be used in the examples that follow, it will be appreciated that other suitable sets of peripheral devices 14 could be provided, including sets of more or fewer display panels 14B, 14C.

The connections between the client device 12 and the docking station 11, between the docking station 11 and the network 13, and between the docking station 11 and any or all of the peripheral devices 14 can be over any appropriate local or network connection, through any appropriate connection interface, which may be wired or wireless and can include the internet. It will be appreciated that the client device 12 may be any kind of mobile computing device that can connect to the docking station 11. For example, the client computing device may comprise a laptop computer, a tablet, or a mobile phone, such as a smartphone.

Figure 2A:
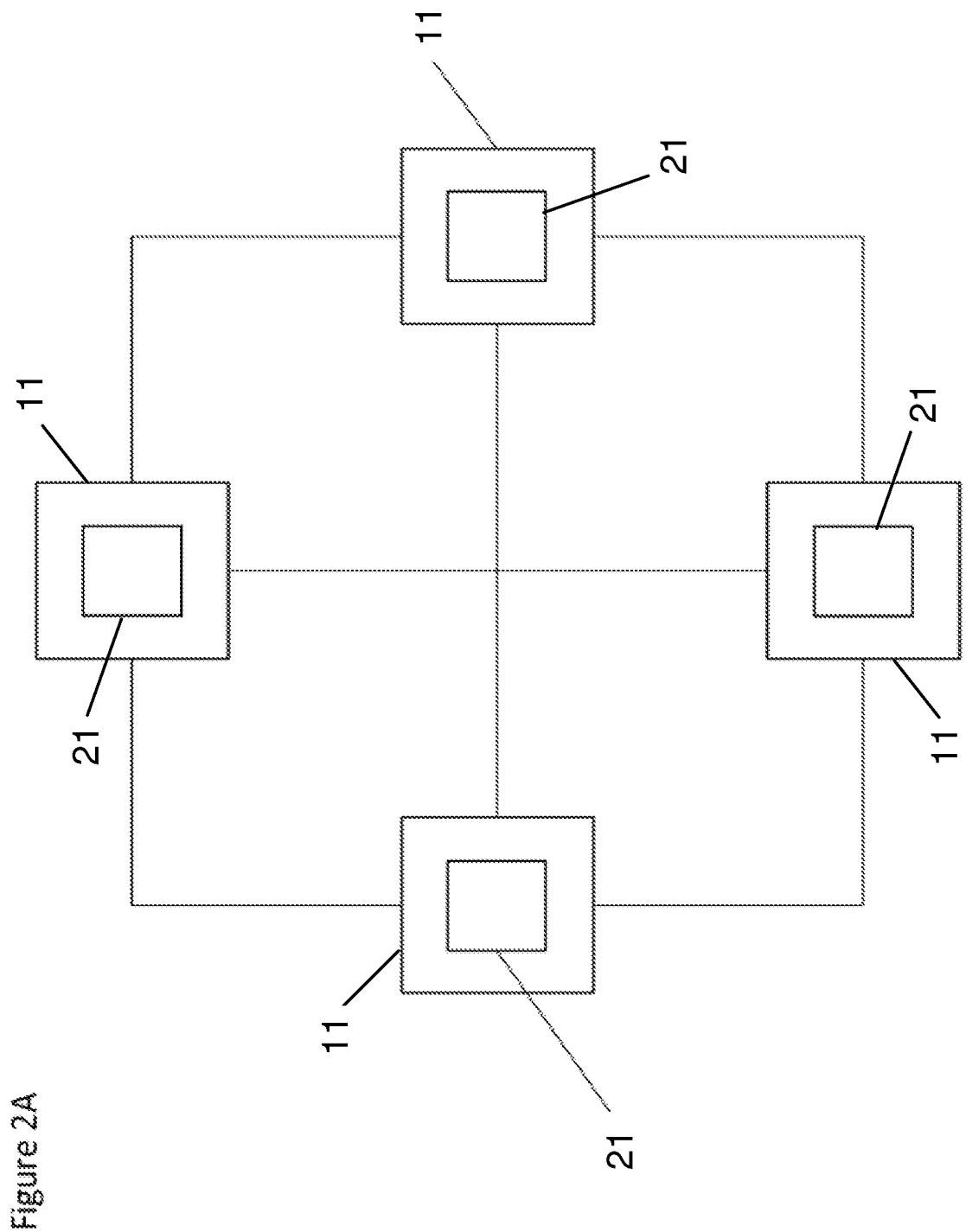
FIGS. 2A to 2C show examples of network topography.

FIG. 2A shows a first example of a network topography (e.g., a distributed network topology) in accordance with one or more embodiments. The system comprises four docking stations 11, such as the one shown in FIG. 1, which are connected to one another for communications. It will be appreciated that each docking station 11 need not necessarily be directly connected to every other docking station 11. For example, one of the docking stations 11 may be configured to communicate with another of the docking stations 11 via an intermediate device (for example, a switch or other network component). Each docking station 11 includes a memory 21, which may be volatile, non-volatile, Random Access Memory (RAM), and/or Read Only Memory (ROM), for example, and may include one or more memory chips or banks, as appropriate. The memory 21 stores mappings and Configuration Sets, as will be described in more detail later with reference to FIGS. 3A to 6. In this topography, configurations may be shared between the docking stations 11.

Figure 2B:
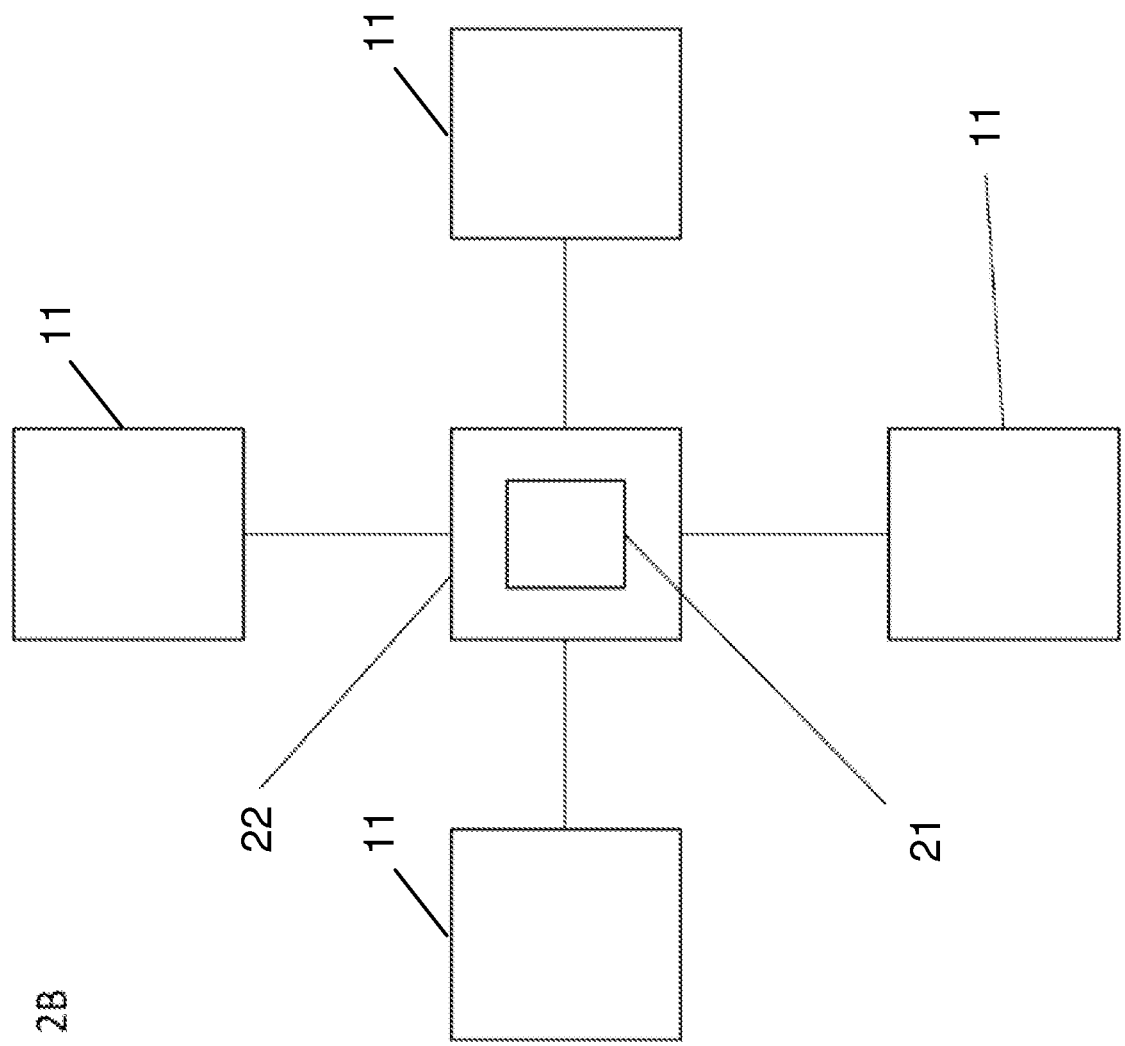

FIG. 2B shows a second example of a network topography arranged in a centralised network topography Similar to the distributed network topography shown in FIG. 2A, this centralised network topography comprises four docking stations 11. However, in this example, the docking stations are connected to a central control server 22 over a wired or wireless network connection. The central control server 22 comprises a memory 21 configured to store mappings and Configuration Sets. In this topography, configurations are transmitted from the docking stations 11 to the central control server 22 and are stored in the memory 21 of the central control server 22.

Figure 2C:
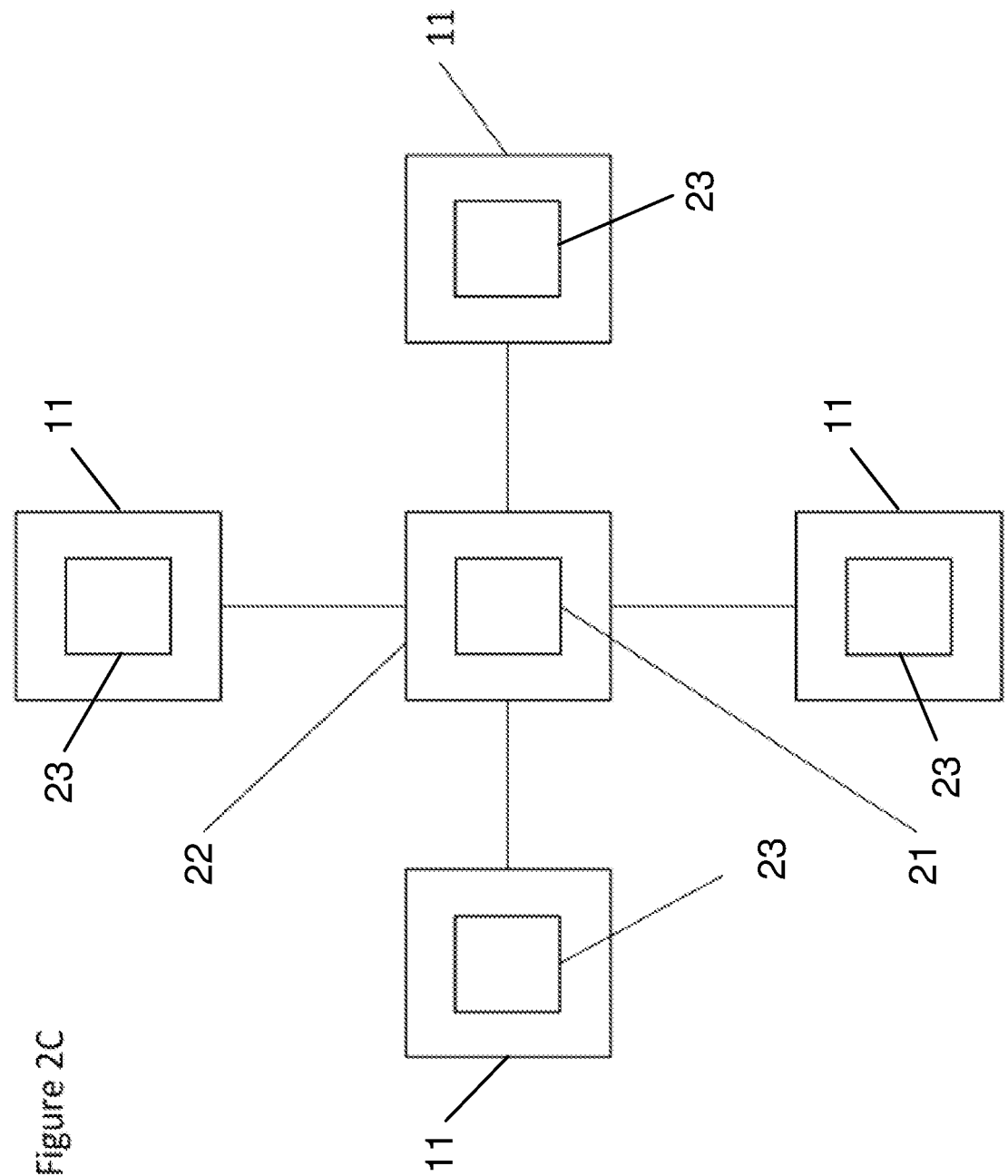

FIG. 2C shows a third example of a network topography, a hybrid network topology that may utilise both the distributed and centralised configurations described above with reference to FIGS. 2A and 2B. The hybrid network topography may be beneficial when, for example, a network uses docking-station-specific settings in combination with more general settings (for example, settings that may be applied at every docking station 11 in the network, or at a subset of the docking stations 11) Similar to the network shown in FIG. 2B, this network topography comprises four docking stations 11, which may be connected to one another, and/or connected to a central control server 22. The central control server 22 comprises a memory 21 configured to store mappings and Configuration Sets from the one or more docking stations as previously described. The mappings and Configuration Sets may be preset or preloaded in the memory of the docking station as part of the manufacturing process, or may be loaded or set, or configured by a user prior to being transmitted, by the wired or wireless network connection to the central control server 22. Alternatively, it will be appreciated that the mappings and Configuration Sets may be input into the memory 21 of the central control server 22 by, for example, a network administrator. In addition, one or more of the docking stations 11 may also incorporate a memory 23 which is configured to store docking-station-specific settings such as environmental settings which may be combined with the Configuration Sets stored at the central control server 22.

FIGS. 3A-3D show example Configuration Sets comprising various settings which may be applied to the docking stations 11, client computing devices 12, and/or peripheral devices 14 when different users and/or client computing devices 12 are connected to any docking station 11 in the network. Some of the settings in these example Configuration Sets are applicable to the peripheral devices 14 shown in the arrangement of FIG. 1. It will be appreciated, however, that some of the settings apply to peripheral devices 14 that are not illustrated in the arrangement of FIG. 1.

The settings in the Configuration Sets may include, for example:
Network: Network settings for the docking station's connection to the network 13 and/or other communications connections between devices as described herein. The network settings may include security settings such as whether access to particular network locations and/or devices is permitted;
Display 1: The logical arrangement of a first display panel 14B relative to other display panels;
Display 2: The logical arrangement of a second display panel 14C relative to other display panels;
Webcam: Activation settings of the webcam 14A;
Headphones: Activation settings and volume settings for the headphones 14E;
Speakers: Activation settings and volume settings for speakers (not shown in FIG. 1);
Microphone: Activation settings for the microphone 14D;
Keyboard: Keyboard settings, such as keyboard layout settings to be used with the keyboard 14F, which may include language specific settings;
Mouse: Activation settings for the mouse 14G;
Joystick: Activation settings for a joystick (not shown in FIG. 1); and
Applications: Layout settings for windows of applications running on a connected client device 12 such as productivity applications, games, internet browsers, virtual machine desktop applications, etc.

It will be appreciated that this list of settings is not exhaustive and that any other suitable configuration setting for any device could be included as appropriate.

FIG. 3A shows an example Configuration Set (Set U1) in which the corresponding settings are as follows:
Network: Internal User. This could indicate, for example, full access to the network 13, including unlimited data use and access to network resources.
Display 1: Left. This indicates that when a plurality of display panels are present (including, where appropriate, an integral display panel on a client device such as a laptop) the first display panel 14B should be mapped as being located on the far left. In other words, Display 1 should be the left-most display in a logical arrangement of the display panels.
Display 2: Middle. This has a similar meaning to the "Display 1" setting, but the second display panel 14C should be mapped as being in the middle of a layout of display panels. In other words, Display 2 should be the middle display in a logical arrangement of the display panels.
Webcam: Off. This could be a simple Boolean setting indicating whether the webcam 14A is active by default (or can be activated by a user) and able to transmit video data or inactive by default, or whether the webcam 14A should be deactivated entirely when this Configuration Set is in use.
Headphones: Volume 10%. This indicates that the headphones 14E can be used but indicates a default volume setting.
Speakers: Off. This indicates that any speakers should not be used. For example, the speakers may be disabled and may not be enabled by a user. Alternatively, this setting could indicate a default volume setting that may be overridden by a user.
Microphone: Off. This setting could operate in a similar way to the Webcam setting previously described. It could be a simple Boolean setting indicating whether the microphone is active by default (or can be activated by a user) and able to transmit audio data or inactive by default, or whether the microphone should be deactivated entirely when this Configuration Set is in use.

Keyboard: QWERTY. This indicates that the keyboard 14F should be treated as having a standard QWERTY layout, as opposed to, for example, a DVORAK layout.

Mouse: On. This could be a simple Boolean setting indicating whether the mouse 14G should be active or inactive and not to be used.

Joystick: On. This setting could operate in a similar way to the Mouse setting previously described.

Applications: None. This means that there are no preconfigured layouts dictating the default display panels 14B, 14C to be used for specific applications running on the client device 12.

The configuration settings listed in FIG. 3B (Set U2) could operate similarly, though some configuration settings are different from those of Set U1:

Display 2: Right. This has a similar meaning to the corresponding setting in Set U1, but the second display panel 14C should be mapped as being the right-most display in a logical arrangement of display panels.

Mouse: Off. The mouse defaults to off or should be completely disabled.

Applications: Calendar: Display 1. This means that a calendar application running on a connected client device 12 should be displayed (or initially displayed) on a first display panel 14B.

The configuration settings shown in FIG. 3C (Set U3) also operate similarly but have the following differences in the configuration settings:

Network: External User. This could indicate limited access to the network 13, such as internet access without any access to internal network resources.

Display 1: Middle. This has a similar meaning to the corresponding setting in Set U1, but the first display panel 14B should be mapped as being in the middle of a layout of display panels. In other words, Display 1 should be the middle display in a logical arrangement of the display panels.

Display 2: Right. This has a similar meaning to the corresponding setting in Set U1, but the second display panel 14C should be mapped as being the right-most display in a logical arrangement of display panels.

Headphones: Off. This could indicate that the headphones 14E cannot be used (for example, are entirely disabled) or that they are not active by default but could be activated by a user.

Keyboard: DVORAK. This indicates that the keyboard 14F should be treated as having a DVORAK layout regardless of its physical layout.

Joystick: Off. This could indicate that the joystick cannot be used (for example, is entirely disabled) or that the joystick is not active by default but could be activated by a user. Otherwise this setting works as previously described.

Applications: Email: Display 1; VM: Display 2. This means that any email application on a connected client device 12 should (at least initially) be displayed on a first display panel 14B and any virtual machine desktop application should (at least initially) be displayed on a second display panel 14C. In this case, this means that the second display panel 14C may appear to be connected to a different client device across the network.

Finally, the configuration settings shown in FIG. 3D (Set U4) have the following differences compared to the settings in Set U1:

Network: External User. This could indicate limited access to the network 13, such as internet access without any access to internal network resources.

Display 2: Right. This has a similar meaning to the corresponding setting in Set U1, but the second display panel 14C should be mapped as being the right-most display of a logical arrangement of display panels.

Headphones: Volume 50%. This indicates that the headphones should at least initially have a volume setting of 50%. Otherwise this setting works as previously described.

Keyboard: DVORAK. This indicates that the keyboard 14F should be treated as having a DVORAK layout regardless of its physical layout.

Joystick: Off. This could indicate that the joystick cannot be used (for example, is entirely disabled) or that the joystick is not active by default but could be activated by a user. Otherwise this setting works as previously described.

FIG. 4 shows an example correspondence table showing relationships between various Configuration Sets, users and devices, in accordance an embodiment of the present disclosure. The correspondence table could be stored at the docking stations 11 in a network such as those shown in FIG. 2A or at the central control server 22 in a network such as that shown in FIG. 2B. The correspondence table comprises mapping between users, client devices 12, and Configuration Sets, such that, for example, a user-device pair is associated with a Configuration Set.

It will be appreciated that the correspondence table in the illustrated embodiment indicates that at least one of a user and a device are associated with a particular Configuration Set. Therefore, a configuration to apply at a docking station can be determined based on at least one of a characteristic of the user or a characteristic of the device. A characteristic of the user may be, for example, an identity of the user or a class of the user. For example, the class of the user may indicate that the user is a network administrator. A characteristic of the device may be, for example, an identity of the device. The identity of the device may be indicated by an identification number, such as a globally unique (or locally unique) identifier. The identification number may be built into the Basic Input/Output System (BIOS) of the mobile device. A characteristic of the device may also be a capability of the device such as wireless and/or wired connections that the device may be capable of utilising, or an operating system of the device.

In the example correspondence table of FIG. 4, the user Anne is associated with two client devices 12 (such as client devices 12 of FIG. 1): Anne's Laptop and Anne's Tablet. Of these, the pair of Anne and Anne's Laptop is associated with Configuration Set U1: the set shown in FIG. 3A, while the pair of Anne and Anne's Tablet is associated with Configuration Set U2: the set shown in FIG. 3B. Similarly, the user Beth is associated with two client devices 12: Beth's Laptop and Beth's Tablet and, of these, the pair of Beth and Beth's Laptop is associated with Configuration Set U3: the set shown in FIG. 3C, and the pair of Beth and Beth's Tablet is associated with Configuration Set U4: the set shown in FIG. 3D.

The Configuration Sets do not need to be unique and different Configuration Sets can be associated with different users even where the client device 12 used is the same. Thus, a Configuration Set may be user-specific, device specific, or a combination of both. For example, both Anne and Beth are associated with the client device 12 Shared Terminal, but the pair of Anne and Shared Terminal 12 is associated with Configuration Set U1 (FIG. 3A) while the pair Beth and Shared Terminal 12 is associated with Configuration set U4 (FIG. 3D). This indicates that a different Configuration Set should be applied depending on whether Anne is using the shared terminal (set U1) or Beth is using the shared terminal (set U4).

FIG. 5 shows a further example correspondence table in which a user ID is associated with a particular Configuration Set. In this example, when user U1001 (for example, corresponding to Anne) connects to a docking station in the network, the correspondence table indicates that Configuration Set U1 should be applied. It will be appreciated, therefore, that the Configuration Set to be applied may be independent of the particular user device that connects to the docking station and may instead depend on the identity of the user.

FIG. 6 shows a further example correspondence table in which a device ID of a user device connected to a docking station is associated with a particular Configuration Set. In this example, when device D2001 (for example, corresponding to Anne's laptop) connects to a docking station in the network, the correspondence table indicates that Configuration Set U1 should be applied. It will be appreciated, therefore, that the Configuration Set to be applied may be independent of a particular user and may instead depend on the identity of the device.

FIGS. 7A and 7B show example Dock Configuration Sets which can be applied to a docking station 11 when different users and/or client devices 14 are connected to the docking station 11. In other words, a Dock Configuration Set is a group of settings associated with a particular docking station 11. Settings of the Dock Configuration Set may override some or all of the settings of a Configuration Set associated with a particular user or client device selected to be applied to the docking station 11, client device 12, and peripheral devices 14 where they overlap or may be used as defaults where there is no configuration in the selected Configuration Set. They can also include environmental configuration settings (for example, settings related to the environment in which the docking station is installed, such as proximity to a strong light source, or related to another characteristic of the particular docking station such as the available hardware) which are not related to the client device 12 or peripheral devices 14 and would not be appropriate to apply at all of the docking stations in the network.

In this example, the following configuration settings are available in the Dock Configuration Sets:
- Display 1: The relative location of a first display panel 14B, as previously described;
- Display 2: The relative location of a second display panel 14C, as previously described;
- Desk Height: The height of the desktop for an adjustable desk;
- Desk Light: Activation settings for a light in the desk area;
- Blinds: Activation settings for blinds on a window near the desk area;
- Climate control: Temperature settings for the desk area.

It will be appreciated that these settings are examples and that any other suitable configuration settings for any suitable devices may be included as appropriate.

The configuration settings shown in FIG. 7A (Set D1) may operate as follows:
- Display 1: Left. This has the same meaning as the corresponding setting in the Configuration Sets described above;
- Display 2: Right. This has the same meaning as the corresponding setting in the Configuration Sets described above;
- Desk Height: 51. This may mean that the default height of an adjustable desk at the location of the docking station is 51 cm from a base level;
- Desk Light: Off. This means that by default a light incorporated into or in the area of the desk or docking station 11 is turned off;
- Blinds: These settings vary by time such that, for example between 00:00 and 10:00 blinds on a window near the desk or docking station are open; between 10:00 and 15:00 they are closed (for example, because the window is on the south side of a building and this is when it receives the most direct sun); and between 15:00 and 00:00 they are open;
- Climate control: These settings also vary by time such that the temperature in the area of the desk or docking station is maintained at 15° C. between 00:00 and 08:00 since it is unlikely that the desk will be in use, at 20° C. between 08:00 and 19:00 as an approximation of a working day during which the desk is expected to be in use, and at 15° C. between 19:00 and 00:00 when the desk is unlikely to be in use.

The configuration settings shown in FIG. 7B (Set D2) may operate similarly, but in this example the following configuration settings are different from those of Set D1:
- Desk Height: 80. This may mean that the default height of an adjustable desk at the location of the docking station is 80 cm from a base level;
- Desk Light: On. This means that by default a light incorporated into or in the area of the desk or docking station 11 is turned on;
- Blinds: Closed. This means that by default the blinds on a window near the desk or docking station are always closed;
- Climate control: This setting indicates that the temperature in the area of the desk or docking station should maintained at 15° C., but that the temperature is adjustable by the user. Alternatively, the setting may be configured to be non-adjustable, such that a user of the workstation cannot override the assigned temperature.

Such settings could be determined and configured when the docking station is installed and brought online and/or could be determined and configured during manufacturing. The settings could also be amended depending on user behaviour as described with reference to FIG. 9 below.

Figure 8:
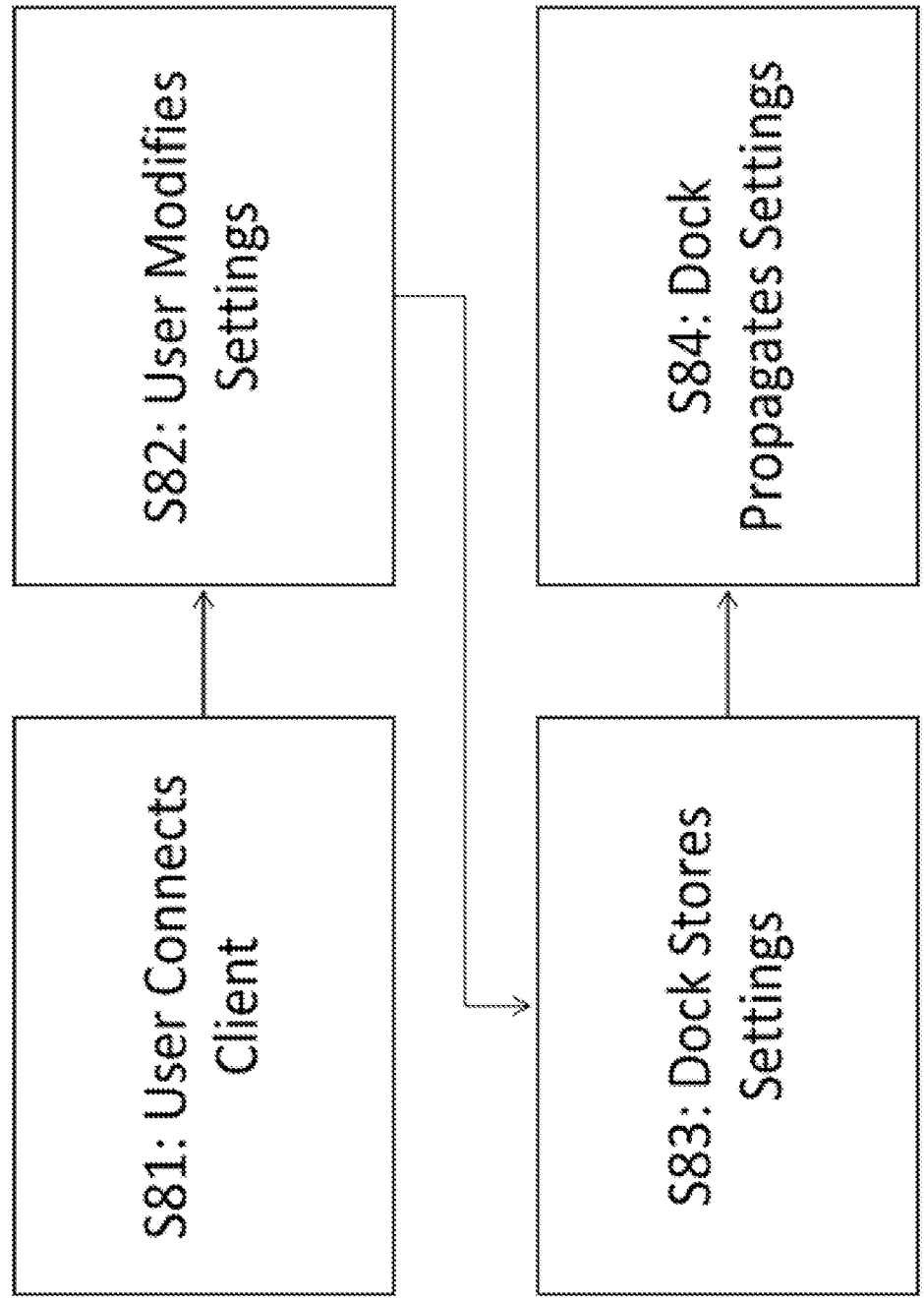
FIG. 8 shows an example method of saving configuration details.

FIG. 8 shows a process diagram by which the mappings and Configuration Sets shown in FIGS. 3A to 6 are created and stored. At Step S81, a user connects a client device 12 to a docking station. For example, a user with a device 12 could connect to a docking station 11 on the network for the first time. The user connects their client device 12 to the docking station 11 in the conventional way and the client device 12 interacts with the peripheral devices 14 and the network 13 according to default settings. For example, the client device 12 may be initially configured to use the mouse 14G, keyboard 14F, and headphones 14E but not any of the other peripheral devices 14A, 14B, 14C, 14D and to connect to the network 13 according to the network's default privacy and security settings.

Such a set of default configuration settings could also be determined based on existing knowledge of the user or client device 12. For example, with reference to the example users listed in FIG. 4, if Anne connects a new client device 12 (for example, Anne's Smartphone), the docking station 11 could determine that the pair of Anne and Anne's Smartphone is not a known pair for which it has a stored correspondence relationship indicating a particular Configuration Set, but that there is at least one other pair that includes Anne. In this case, a Configuration Set corresponding to one of the other pairs that includes Anne (such as the pair of Anne and Anne's Laptop) may be used (in this example, corresponding to Configuration Set U1 or U2). Alternatively, the settings in common between Configuration Sets that are associated with Anne could be determined and applied based on the assumption that Anne will wish to use similar settings for all her client devices 12. In this example, Configuration Sets U1 and U2 (which are associated with Anne in at least one row of the table) have the following settings in common:

Network: Internal User
Display 1: Left
Webcam: Off
Speakers: Off
Microphone: Off
Keyboard: QWERTY
Joystick: On Therefore, these settings could be determined to be applied at the docking station, and the remaining settings could then be configured based on system defaults or averages between the Configuration Sets. For example, a system default could be that display panels 14B, 14C should be inactive until they have been configured. In this example Display 1 14B is configured to be the left-most display in a logical arrangement of displays (since this setting is indicated in both set U1 and U2). In contrast, Display 2 14C, not being identically configured between the two Configuration Sets, could be set as inactive. As a further example, headphone volume has a numeric value in each of the Configuration Sets and an average value between the two values could be used. In this example, the value of 10% from set U1 and the value of 50% from set U1 are averaged to determine that the Headphones volume setting should be set at a volume level of 30%.

Similarly, user groups indicating a class of user could be used to determine the Configuration Set to apply. For example, if an indication is stored (for example, in the table of FIG. 4 or the table of FIG. 5) that Anne is an employee and that Beth is a contractor, a new user who is indicated to be an employee could have default configurations determined based on Anne's configuration settings, since both the new user and Anne belong to the same class of user.

In a second example, default configuration settings could be selected based on the type of client device 12. In the examples of FIG. 4 and FIG. 6, additional information could be added indicating the type, manufacturer, owner (if this is different to the user, for example where devices are issued to employees by an employer), or any other appropriate device group. This information may also be referred to as a 'characteristic' of the user device. In this example, Anne's Laptop 12 and Beth's Laptop 12 could both be indicated as "computers" and Anne's Tablet 12 and Beth's Tablet 12 could both be indicated as "mobile devices". As in the above example, if a new user connects a laptop 12 which indicates that it is a "computer", the docking station 11 could determine that the user and client device 12 are not a known pair for which it has stored configuration settings, but that the two "computers" 12 for which it has mappings use Configuration Sets U1 (FIG. 3A) and U3 (FIG. 3C). As previously described, it could then determine commonalities between the two Configuration Sets and apply those as defaults. In this example the common settings are:

Webcam: Off
Speakers: Off
Microphone: Off
Mouse: On

Since in both Configuration Sets the keyboard 14F is active, though in different configurations, the keyboard 14F could be active with a manufacturer defined configuration (for example, if the physical keys are laid out in a QWERTY configuration, this configuration could be used as the default configuration). Other settings could then be configured based on system defaults or averages, as previously described.

In a third example, in a network topography such as that shown in FIG. 2C and where there are docking-station-specific settings available, appropriate settings from stored Dock Configuration Sets such as those shown in FIGS. 7A and 7B could be used to generate default configuration settings. For example, if the user connects their client device 12 to a docking station 11 which is associated with Dock Configuration Set D1, and the docking station 11 determines that there are no stored configuration settings for the connected user and client device 12, the docking station 11 could determine to apply appropriate settings from the Dock Configuration Set D1, such as:

Display 1: Left
Display 2: Right

The docking station 11 could then determine other settings to apply using, for example, a method such as those described in the previous two examples. This allows a level of intelligence to be applied to determining the settings and reduces input required from the user, thus saving time and reducing the likelihood of mistakes. Moreover, the settings can beneficially be more easily updated per docking station, per group of docking stations, per user, or per client device, by updating the appropriate Configuration Set or Dock Configuration Set. For example, a network administrator may alter a setting in Set D1 and cause the updated Set D1 to be transmitted to, and stored at, a corresponding group of docking stations.

At Step S82, the user modifies the settings, possibly using a device interface to activate the peripheral devices 14 and change their configurations by, for example, moving the relative "locations" of the canvases associated with the display panels 14B, 14C or activating the webcam 14A. As is known, a canvas holds various drawing elements (lines, shapes, text, frames containing other elements, etc.) on which they can be arranged according to the image to be shown. For example, if default settings identical to those shown in Configuration Set U1 were applied when the user connected at Step S81, in which the default setting of the webcam 14A is "off", the user might activate the webcam 14A.

At Step S83, the docking station 11 may compare the modified settings with already-stored collections of settings (Configuration Sets) in order to determine if the user is using the same collection of settings as another user-device pair. For example, an individual user may use the same configurations for all of their client devices 12. Although a new Configuration Set can then be generated and stored for every client device 12, in an alternative, an existing Configuration Set could be referenced and used. The latter would have the advantage of saving memory space. In other words, if the modifications to the settings made by the user result in a collection of settings that matches those of Configuration Set U1, there is no need to generate and store a new Configuration Set, since the label 'Set U1' can be used to identify the settings.

If the docking station 11 does not determine whether the modified settings are the same as an existing collection of settings, or if the docking station determines that there is no matching collection of settings (no matching Configuration Set), the docking station 11 stores the settings as a new Configuration Set.

Continuing the example of Step S83, after the user has activated the webcam 14A, the docking station 11 searches the available Configuration Sets—either in its own memory 21 in a network topography such as that shown in FIG. 2A or through a request to the central control server 22 in a network topography such as those shown in FIGS. 2B and 2C—to determine if there exists a Configuration Set corresponding to the modified settings. In this example, the docking station 11 searches the available Configuration Sets for the modified version of Configuration Set U1 having the following settings (in which "Webcam: Off" has been modified to specify "Webcam: On"):

Network: Internal User.
Display 1: Left.
Display 2: Middle.
Webcam: On
Headphones: Volume 10%.
Speakers: Off.
Microphone: Off.
Keyboard: QWERTY.
Mouse: On.
Joystick: On.
Applications: None.

If, for example, the Configuration Sets shown in FIGS. 3A to 3D are all the Configuration Sets currently saved, the docking station 11 will not find a matching Configuration Set and therefore saves the amended settings as a new Configuration Set.

If the user had, beginning with default settings identical to those shown in Configuration Set U1, moved the canvas associated with Display 2 14C to be apparently located on the far right, increased the volume of the headphones 14E to 50%, de-activated the mouse 14G, and indicated that a calendar application should by default be shown on Display 1 14B, the docking station 11 could determine that the amended settings are identical to those of Configuration Set U2, and therefore associate the user-device pair with Configuration Set U2.

At Step S84, the docking station 11 propagates the new settings, or the association between the user-device pair and an existing Configuration Set, through the network. This could mean updating a correspondence table such as the one shown in FIG. 4 to add the user, client device 12, and a reference to the Configuration Set. Where a new Configuration Set has been created, it could also mean transmitting the Configuration Set to other docking stations 11 in a network topography such as that shown in FIG. 2A, and/or to the central control server 22 in network topographies such as those shown in FIGS. 2B and 2C. Therefore, when the user connects the client device to any docking station 11 in the network, the corresponding Configuration Set can be determined using a correspondence table such as that shown in FIG. 4, as will be described in more detail later with reference to FIG. 10.

Figure 9:
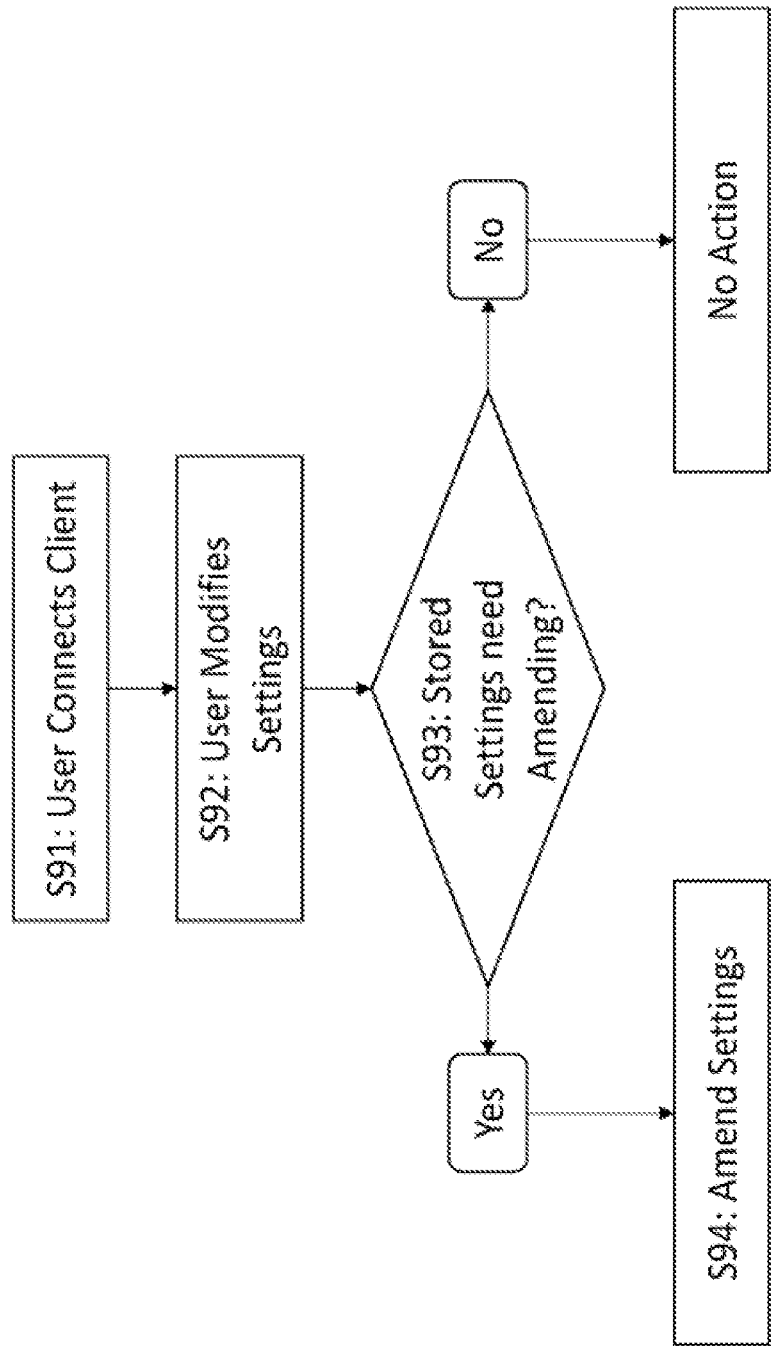
FIG. 9 shows an example method of amending dock configuration details.

FIG. 9 shows a method in which the Dock Configuration Sets shown in FIG. 5 are modified and stored. At Step S91, a user connects a client device 12 which may be a known client device 12 or a new client device in the context of the network to a docking station 11. When the docking station 11 detects the connection of a client device 12, it retrieves its associated Dock Configuration Set stored in its internal memory 23 and applies the configuration settings to itself and its peripheral devices, including, as appropriate, surrounding devices such as, in the examples of the Dock Configuration Sets shown in FIGS. 7A and 7B, a blind controller, light switch, desk height controller, and climate controller. For example, when Dock Configuration Set U1 shown in FIG. 7A is used, the desk height is set at 51 cm from a minimum height based on the construction of the desk: an appropriate height for when a user is seated.

Whilst the example Dock Configuration Sets shown in FIGS. 7A and 7B are not associated with user/client pairs in the same way as the Configuration Sets shown in FIGS. 3A to 3D are shown to be in FIG. 4, this need not necessarily be the case. Alternatively, there may also be mappings between Dock Configuration Sets and user/client pairs such that—in an example referring to the users named in FIG. 4—when Anne connects a client device 12 to a first docking station 11, the configuration settings described in Dock Configuration Set D1 are used, and when Beth connects a client device 12 to the same docking station 11, the configuration settings described in Dock Configuration Set D2 are used. Accordingly, the Dock Configuration Sets may be propagated through the network and/or stored in a central control server 22 in the same way as the Configuration Sets. For simplicity, however, in this description the Dock Configuration Sets will be treated as specific to docking stations 11 rather than to users or user devices.

At Step S92, the user modifies the settings used, for example raising the desk height to 90 cm (suitable for when the user is standing). At Step S93, the docking station 11 determines whether this alteration to the settings should result in a stored Dock Configuration Set being updated. The determination might be based on any of the following considerations or any combination of them, for example:

The Dock Configuration Set cannot be amended (for example, amending the Dock Configuration Set is forbidden by a network administrator) and no changed settings are stored;

Some configuration settings stored in the Dock Configuration Set can be amended and some cannot. For example, it may be desirable to allow the desk height setting to be amended, but not the blinds or climate control as these may be co-ordinated with other systems;

Amendments to settings are combined with previous settings such that, for example, a numerical value may be a moving average of all inputs. In this example, the climate control setting may initially be configured such that during the day the temperature is 20° C., but if a user amends it to 22° C. an average of these values is then stored: 21° C., and if a further user amends it to 22° C. again a further average is calculated and stored: 21.5° C., and so on;

Amendments to settings are determined by voting such that, for example, a binary setting may remain unchanged until a majority of users have amended it, after which the amendment is saved. In this example, the desk light setting may initially be configured such that the light is off by default, but if a first user turns it on the setting is amended such that the light is on by default, then if a second user turns it off the setting is unchanged but a count is stored to indicate how many users used the setting "Desk Light: On" and how many used the setting "Desk Light: Off", and the stored setting is amended once more users use the "Off" setting than the "On" setting;

Whether an amendment is stored depends on the time for which the amendment is in force, such that, for example, if the desk light setting is initially configured such that the light is off by default, no change will occur from a user simply turning the light on for less than a threshold period of time, but if the light is on for more than the threshold period of time the stored setting is amended such that the light is on by default;

Timings are added or removed from stored settings such that, for example, if the desk light setting is initially configured such that the light is off, but multiple users turn it on between particular times as determined in accordance with a heuristic such as one of those listed above, a timed setting may be added (such as those shown in the Dock Configuration Sets in FIGS. 7A and 7B for the blinds and climate control settings) such that the light is on by default between those times and otherwise off by default.

As suggested by the existence of time-based configuration settings, new configuration settings can be determined and applied at any point during the connection of the client device 12 to the docking station 11, not only when a client device 12 is initially connected. Naturally, these are examples only and other heuristics could be used. If the docking station 11 determines that no changes to the stored settings are required, the process follows the branch to the right, beginning at "No", and no action is taken. If the docking station 11 determines that changes to the stored settings are required, the process follows the branch to the left, beginning at "Yes", to Step S94.

At Step S94, the docking station 11 determines the Dock Connection Set in use and the settings to be amended and stores the new values in its internal memory as appropriate. For example, if, as previously described, Dock Configuration Set D1 as shown in FIG. 5 is in use and the docking station 11 has determined that the desk height setting should be amended from 51 to 60, it overwrites the appropriate value in memory 23 with the new value. This value can then be used for future connections.

Figure 10:
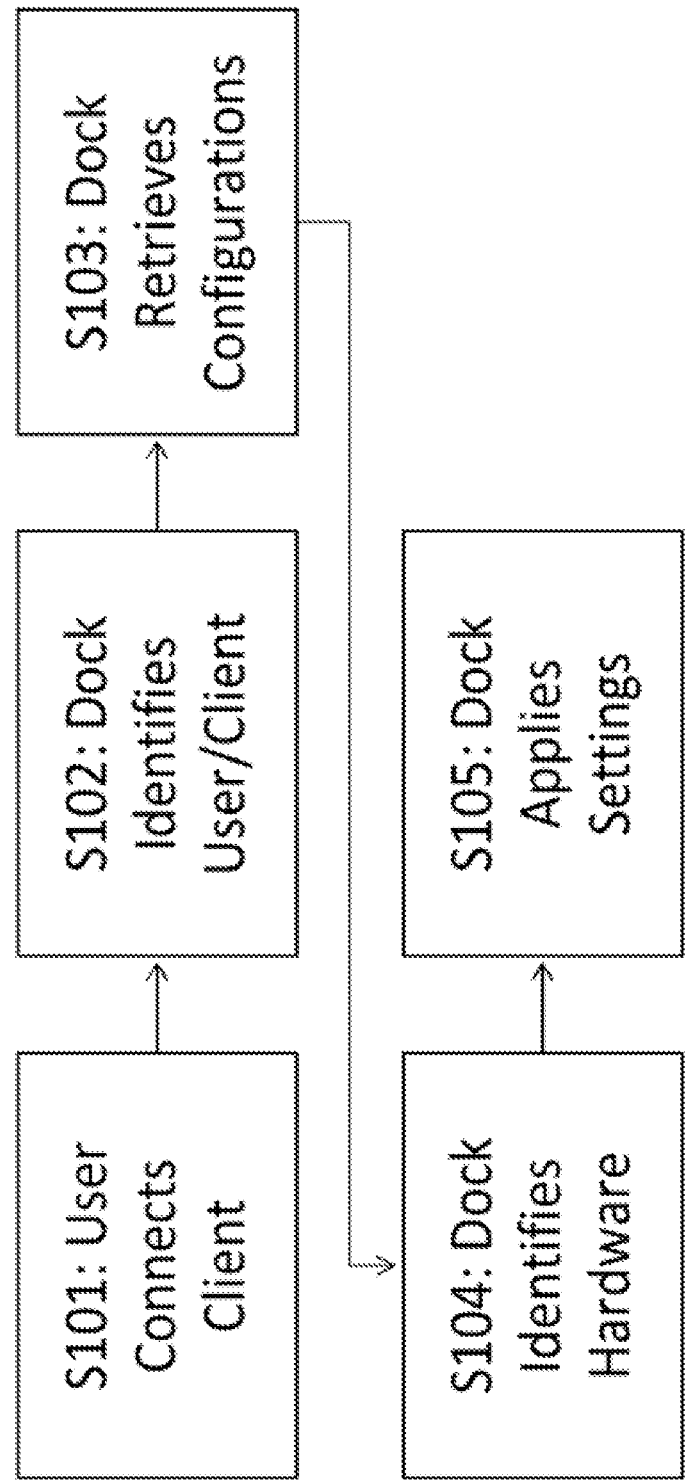
FIG. 10 shows an example method of applying configuration details.

FIG. 10 shows a method of determining settings to apply when a known user with a known client device 12 connects to a docking station 11 on the network. This process could be used for any of the network topographies illustrated in FIGS. 2A to 2C, and will be described sequentially for all three, beginning with the network topography shown in FIG. 2A, which does not use Dock Configuration Sets.

At Step S101, a user connects their client device 12 to a docking station 11. This connection may be over any appropriate wired or wireless local connection. At Step S102, the docking station 11 identifies the user and the client device 12. This identification may be via flags transmitted by the client device 12, for example as part of the initial connection handshaking, or the user might manually identify themselves—for example using an authentication or security method such as a username and password, or a handprint reader on a desk and/or on their client device 12. In one example, once the user has identified themselves, the docking station 11 could determine a list of client devices 12 associated with that user and the user could then use an interface to select the client device 12 they are using. Identifications of the user and/or the client device 12 could also be determined via a globally unique identifier included in the BIOS of the client device 12 which could be stored instead of a user-device pair. For the purposes of this description, the process will be described for the user-device pair of Anne and Anne's Tablet 12.

In this example, when Anne connects Anne's Tablet 12 by, for example, connecting a Universal Serial Bus (USB) cable between the tablet and the docking station 11, the tablet 12 can transmit an indication to the docking station 11 of its identity, such as a MAC address, together with a flag indicating that Anne is logged in. The docking station 11 can accept this as an indication that the connected user-device pair is Anne and Anne's Tablet 12.

At Step S103, the docking station 11 retrieves correspondence information such as that shown in FIG. 4 stored in its internal memory 21. The docking station 11 then determines, using the stored correspondence information, what the associated Configuration Set is for the user-device pairing of Anne and Anne's Tablet 12: in this example, Configuration Set U2. The docking station 11 then retrieves this Configuration Set from its memory 21.

At Step S104, the docking station 11 identifies the peripheral devices 14 to which it is connected, and the available connections to the network 13, in order to determine which configuration settings are appropriate to apply. This could involve polling the connected peripheral devices 14 for identifications, or it could already have such identifications stored, for example as a record in its memory of what type of peripheral device 14 is connected to each port. In this example, the connected peripheral devices 14 and available connections through network 13, as previously described, are a network connection to network 13, a webcam 14A, two display panels 14B. 14C, a microphone 14D, headphones 14E, a keyboard 14F, and a mouse 14G. This means that the settings from the Configuration Set relating to speakers and a joystick are irrelevant and can be discarded for the purposes of this docking station 11.

At Step S105, the docking station 11 applies the relevant settings from the Configuration Set to the peripheral devices 14, the network connection and client device 12, for example:

configuring the connection to network 13 to allow access to all network locations, in accordance with an Internal User profile;

transmitting an Extended Display Identification Data (EDID) and other configuration and identification information of Display 1 14B to the client device 12 and indicating that the associated display canvas created by the operating system should be apparently located to the left of an internal screen of the client device 12;

likewise, transmitting configuration and identification information of Display 2 14C to the client device 12 and indicating that its respective display canvas should be apparently located to the right of an internal screen of the client device 12;

deactivating the webcam 14A if it was active;

activating the headphone port if it was inactive and setting the output volume of the headphones 14E to 50% and/or transmitting a signal to the client device 12 indicating that it should use the headphones 14E as the main audio output and set its output volume to 50%;

deactivating the microphone 14D if it was active;

activating the keyboard 14F if it was inactive and transmitting an indication to it that it should be configured to a QWERTY layout, and/or transmitting a signal to the client device 12 indicating that the keyboard input will be in a QWERTY configuration;

deactivating the mouse 14G if it was active; and transmitting a signal to the client device 12 indicating that the windowing manager on the client device 12 should locate display data from any calendar application on Display 1 14B.

Beneficially, therefore, no further user input is required in order for the client device's 12 interaction with the docking station 11 and peripheral devices 14 to be the same as previously configured, regardless of which docking station 11 in the network is used, improving the experience of the user and reducing the time required to manually update settings at the docking station.

In a network topography such as that shown in FIG. 2B, in which there may also be no Dock Configuration Sets, the method could operate similarly as follows. At Step S101, the user connects the client device 12 to any docking station 11 in the network as previously described. At Step S102, the docking station 11 identifies the user and client device 12 as previously described. For the purposes of this part of the description, the example user-device pairing will be described as Beth and Beth's Laptop 12.

At Step S103, the docking station 11 transmits the identifications of the user and client device 12 to the central control server 22 and the central control server 22 retrieves correspondence information, such as that shown in FIG. 4, from its memory 21. The central control server 22 then determines, using the correspondence information, that the Configuration Set associated with the user-device pair of Beth and Beth's Laptop 12 is Configuration Set U3. The central control server 22 then retrieves this Configuration Set from its memory 21 and transmits Configuration Set U3 to the docking station 11.

At Step S104, the docking station 11 determines which settings from the Configuration Set received from the central control server 22 are required and discards the others as previously described. At Step S105, the docking station 11 applies the relevant settings to the connected peripheral devices 14, connections to the network 13 and client device 12 as previously described, for example:
  configuring the connection to the network 13 to bar access to network locations and only allow access to the internet, in accordance with an External User profile;
  transmitting the EDID and other configuration and identification information of Display 1 14B to the client device 12 and indicating that the display canvas created by the operating system should be apparently located to the middle of a group of displays, which may mean to the right of an internal display;
  likewise, transmitting configuration and identification information of Display 2 14C to the client device 12 and indicating that its respective display canvas should be apparently located to the right of a group of displays;
  deactivating the webcam 14A if it was active;
  deactivating the headphone port if it was active;
  deactivating the microphone 14D if it was active;
  activating the keyboard 14F if it was inactive and transmitting an indication to it that it should be configured to a DVORAK layout, and/or transmitting a signal to the client device 12 indicating that the keyboard input will be in a DVORAK configuration;
  activating the mouse 14G if it was inactive; and
  transmitting a signal to the client device 12 indicating that the windowing manager on the client device 12 should locate display data from any email application on Display 1 14B and any word processing application on Display 2 14C.

In a network topography such as that shown in FIG. 2C, which uses Dock Configuration Sets, the method could operate in a similar way, with additional consideration of the Dock Configuration Set as follows. At Step S101, the user connects a client device 12 as previously described, and at Step S102 the docking station 11 identifies the user and/or client device 12 as previously described. For the purposes of this description, as before, the process will be described for the user-device pair of Beth and Beth's Laptop 12.

At Step S103, the docking station 11 retrieves the Configuration Set and Dock Configuration Set. In the network topography shown in FIG. 2C, this means using the user and client identification to fetch the appropriate Configuration Set from the central control server 22 as previously described in the second example of the method. In another embodiment in which storage of the Configuration Sets is distributed as shown in FIG. 2A, it may mean fetching the appropriate Configuration Set from the local memory 21 on the docking station 11 as previously described in the first example of the method. In this example, this is Configuration Set U3 as described in FIG. 3C. In some cases, the appropriate Configuration Set may be located in a memory of another docking station. For example, the central control server may distribute storage of the Configuration Sets to memories in various docking stations, if desirable for balancing memory space, for example. In both cases, the Dock Configuration Set is retrieved from the docking station memory 23 without reference to the user and/or client identification, though in another embodiment they might be used, as previously mentioned. For example, the docking station 11 to which Beth has connected her laptop 12 may use Dock Configuration Set D2.

At Step S104, the docking station 11 determines which settings from the Configuration Set are required and discards the others as previously described. At Step S105, the docking station 11 applies the appropriate settings from the Dock Configuration Set (set D2) and Configuration Set (set U3) as appropriate. In this example, there is a conflict between the settings: according to Configuration Set U3, which is associated with the user/client pair of Beth and Beth's Laptop 12, Display 1 14B should be positioned in the middle. However, according to Dock Configuration Set D2, Display 1 14B should be positioned on the left. This conflict could be resolved using prioritisation heuristics: for example, the user's preferences as described in Configuration Set U3 might be given priority over standardised docking station settings as described in Dock Configuration Set D2. Where the conflict is between numerical values, for example if speaker volume was also stored in the Dock Configuration Set, an average could be used.

In this example the user's preferences are given priority over the standard docking station settings. Accordingly, the docking station applies the relevant settings to the connected peripherals and client device and transmits signals with commands to other controllers as appropriate, for example:
  configuring the connection to the network 13 to bar access to specific network locations and only allow access to the internet, in accordance with an External User profile;
  transmitting the EDID and other configuration and identification information of Display 1 14B to the client device 12 and indicating that the display canvas created by the operating system should be apparently located to the middle of a group of displays, which may mean to the right of an internal display;
  likewise, transmitting configuration and identification information of Display 2 14C to the client device 12 and indicating that its respective display canvas should be apparently located to the right of a group of displays;
  deactivating the webcam 14A if it was active;
  deactivating the headphone port if it was active;
  deactivating the microphone 14D if it was active;
  activating the keyboard 14F if it was inactive and transmitting an indication to it that it should be configured to a DVORAK layout, and/or transmitting a signal to the client device 12 indicating that the keyboard input will be in a DVORAK configuration;

activating the mouse 14G if it was inactive;

transmitting a signal to the client device 12 indicating that the windowing manager on the client device 12 should locate display data (e.g. an application window) from any email application on Display 1 14B and display data (e.g. an application window) from any word processing application on Display 2 14C;

transmitting a signal to a desk height controller connected to the desk associated with the docking station indicating that it should raise or lower the desk to 80 cm above a set minimum height;

transmitting a signal to a light controller connected to a desk light associated with the docking station indicating that it should turn on the light if it is off;

transmitting a signal to a blinds controller connected to blinds on a window near the docking station indicating that it should close the blinds if they are open; and transmitting a signal to a climate controller for the area around the docking station (for example, a small separate office, area of an open-plan office, or meeting room) indicating that it should raise, lower, or maintain the temperature depending on the time of day as indicated.

FIG. 11 is a block diagram of an example computer system 600 suitable for implementing one or more embodiments of the present disclosure, including a docking station 11, a client device 12 and/or the central control server 22. In various implementations, the client device 12 may include a mobile cellular phone, personal computer (PC), laptop, tablet, wearable computing device, etc. adapted for wired and/or wireless communication, and each of the docking station 11 the client device 12 and the central control server 22 may include a network computing device. Thus, it should be appreciated that these devices 11, 12, 22 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user action, such as selecting keys from a keypad/keyboard, selecting one or more buttons or links, etc., and sends a corresponding signal to the bus 612. The I/O component 604 may be connected to an output component, such as a display 602 and to a cursor control 608 (such as a keyboard, keypad, mouse, etc.). An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or Internet Protocol (IP) addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 could be utilised to perform the above described functions of the docking station 11, the client device 12 or the central control server 22.

Executable logic for performing any described functions may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium, such as a magnetic or optical disk or other magnetic/optical storage medium, or FLASH or other solid-state memory (e.g. integrated into a device or in the form of a memory card). In one example, transmission media may take the form of acoustic or light waves, such as those generated during radio wave, optical, and infrared data communications.

In various embodiments of the present disclosure, execution of instruction sequences to practice the present disclosure may be performed by the computer system 600. In various other embodiments of the present disclosure, a plurality of computer systems 600 coupled by the communication link 624 to the network 622 (e.g., such as a wireless local area network, a wireless local area network, public switched telephone network, and/or various other wired or wireless networks, including telecommunications, mobile, and cellular phone networks) may perform instruction sequences to practice the present disclosure in coordination with one another.

The above embodiments and examples are to be understood as illustrative examples. Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

Some embodiments are also described in the following numbered clauses:

1. A docking station, the docking station having one or more settings associated with operation thereof, the docking station comprising:
   one or more inputs for connection to one or more user devices;
   one or more interfaces for connection to one or more peripheral devices and/or a network; and
   one or more processors configured to:
      obtain, from a user device of one or more user devices connected to the docking station, identity information; and
      obtain, based at least partly on the identity information, a configuration set from a plurality of stored configuration sets, the configuration set determining the one or more settings.

2. The docking station of clause 1, wherein each configuration set of the plurality of configuration sets is stored in association with a respective identity of one of a plurality of user devices and/or one of a plurality of user identities.

3. The docking station of clause 1 or 2, wherein the docking station is connected to a network, and the plurality of configuration sets are stored at the docking station, or at another device connected to the network.

4. The docking station of any one of clauses 1 to 3, wherein
   the docking station stores a set of docking station specific settings that is associated with the docking station; and
   the one or more processors are further configured to determine the one or more settings based at least partly on a comparison of the obtained configuration set with the set of docking station specific settings.

5. The docking station of any one of clauses 1 to 4, wherein the one or more processors are further configured to:
   obtain information regarding hardware available at the docking station and/or a network connection available at the docking station; and
   determine the one or more settings based at least partly on the hardware available at the docking station and/or the network connection available at the docking station.

6. The docking station of clause 5, wherein the information regarding the hardware available at the docking station comprises information regarding one or more peripheral devices connected to the docking station.

7. The docking station of clause 4, wherein the set of docking station specific settings that is associated with the docking station defines default settings to be applied at the docking station when the user device connects to the docking station for the first time.

8. The docking station of clause 4 or 7, wherein the set of docking station specific settings that is associated with the docking station comprises at least one member from the group consisting of:
   a height setting of a height-adjustable desk;
   a temperature setting for a climate control unit;
   a display setting that defines a logical arrangement of displays;
   a window blind setting; and
   a lighting setting.

9. The docking station of any one of clauses 1 to 8, wherein the one or more processors are further configured to:
   obtain information regarding capabilities of the user device connected to the docking station; and determine the one or more settings based at least partly on the capabilities of the user device connected to the docking station.

10. The docking station of any one of clauses 1 to 9, wherein the configuration set comprises a setting that defines at least one member from the group consisting of:
    a size or arrangement of an application window;
    a logical arrangement of display panels;
    a brightness or contrast of a display panel;
    a configuration setting for an audio input device;
    a configuration setting for an audio output device;
    a configuration setting for a keyboard;
    a configuration setting for a mouse;
    a network configuration setting; and
    a network security setting.

11. The docking station of clause 10, wherein the setting defines the logical arrangement of display panels, and the logical arrangement of display panels includes a display panel of the user device connected to the docking station.

12. The docking station of any one of clauses 1 to 11, wherein the one or more processors are further configured to:
    receive, from the user device, a request to change a setting of the one or more settings at the docking station; and
    responsive to determining that the request to change a setting should be granted:
       perform the requested setting change;
       generate an updated configuration set; and
       store the updated configuration set in association with the identity information at the docking station or transmit the updated configuration set to another device for storage thereon.

13. The docking station of any one of clauses 1 to 12, wherein the identity information comprises user device identity information, user identity information, or a combination thereof.

14. A device connected to a network to which a docking station is connected, wherein the device is configured to determine a setting to be applied at the docking station, the device comprising:
    one or more interfaces for connection to a network; and
    one or more processors configured to:
       store, at the device, a plurality of configuration sets that each identify at least one setting associated with operation of a docking station;
       receive, at the device from a docking station connected to the network, identity information;
       determine whether the plurality of configuration sets includes a configuration set that is associated with the identity information; and
       responsive to determining that the plurality of configuration sets includes the configuration set that is associated with the identity information:

transmit the configuration set that is associated with the identity information to the docking station to be applied at the docking station.

15. The device of clause 14, wherein the one or more processors are further configured to:
   responsive to determining that the plurality of configuration sets does not include a configuration set that is associated with both an identity of the user device indicated by the identity information and an identity of the user indicated by the identity information:
      determine whether the plurality of configuration sets includes a configuration set that is associated with the user indicated by the identity information but is not associated with the identity of the user device indicated by the identity information;
      responsive to determining that the plurality of configuration sets includes only one configuration set that is associated with the user indicated by the identity information but is not associated with the identity of the user device indicated by the identity information:
         transmit the configuration set that is associated with the user indicated by the identity information but is not associated with the identity of the user device indicated by the identity information to the docking station to be applied at the docking station; and
      responsive to determining that the plurality of configuration sets includes a plurality of configuration sets that are associated with the user indicated by the identity information but are not associated with the identity of the user device indicated by the identity information:
         generate a combined configuration set using the plurality of configuration sets that are associated with the user indicated by the identity information but are not associated with the identity of the user device indicated by the identity information; and
         transmit the combined configuration set to the docking station to be applied at the docking station.

16. The device of clause 15, wherein generation of the combined configuration set comprises calculating an average value of a numerical setting of the plurality of configuration sets that are associated with the user indicated by the identity information but are not associated with the identity of the user device indicated by the identity information.

17. A system comprising:
   a docking station; and
   the device of any one of clauses 14 to 16, the device being either a server or another docking station.

18. The system of clause 17, wherein the docking station has one or more settings associated with operation thereof, and the docking station comprises:
   one or more inputs for connection to one or more user devices;
   one or more interfaces for connection to one or more peripheral devices and/or a network; and
   one or more processors configured to:
      obtain, from a user device of the one or more user devices connected to the docking station, identity information;
      obtain, based at least partly on the identity information, a configuration set from a plurality of stored configuration sets, the configuration set determining the one or more settings.

19. A method of determining a setting to apply at a docking station, the docking station having a plurality of adjustable parameters associated with operation thereof and configurable for an individual user of a user device connected to the docking station, the method comprising:
   obtaining, from a said user device connected to the docking station, device identity information indicating an identity of the user device and/or user identity information indicating an identity of a user of the user device;
   obtaining, based on the user identity information and/or the device identity information, a configuration set, from a plurality of stored configuration sets, the configuration set identifying at least one setting relating to the plurality of adjustable parameters associated with operation of the docking station to be applied at the docking station; and
   determining the setting to apply at the docking station based at least partly on the obtained configuration set.

20. A method of determining a setting to be applied at a docking station, the docking station having a plurality of adjustable parameters associated with operation thereof and configurable for an individual user of a user device connected to the docking station, the method comprising:
   storing, at a device connected to a network, a plurality of configuration sets that each identify at least one setting relating to the plurality of adjustable parameters associated with operation of the docking station to be applied at the docking station;
   receiving, at the device from a docking station connected to the network, device identity information indicating an identity of a user device connected to the docking station and/or user identity information indicating an identity of a user of the user device;
   determining whether the plurality of configuration sets includes a configuration set that is associated with the identity of the user device indicated by the device identity information and/or the identity of the user indicated by the user identity information; and
   if it is determined that the plurality of configuration sets includes the configuration set that is associated with the identity of the user device indicated by the device identity information and/or the identity of the user indicated by the user identity information, transmitting the configuration set that is associated with the identity of the user device indicated by the device identity information and/or the identity of the user indicated by the user identity information to the docking station to be applied at the docking station.

21. A docking station comprising:
   one or more inputs for connection to one or more user devices;
   one or more interfaces for connection to one or more peripheral devices and/or a network;
   a non-transitory memory storing instructions; and
   one or more processors coupled to the non-transitory memory and configured to execute the instructions from the non-transitory memory to cause the docking station to perform operations comprising the method of clause 19.

22. A device connected to a network to which a docking station is connected, the device comprising:
one or more interfaces for connection to a network;
a non-transitory memory storing instructions; and
one or more processors coupled to the non-transitory memory and configured to execute the instructions from the non-transitory memory to cause the device to perform operations comprising the method of clause 20.

23. A system comprising:
a docking station according to clause 21; and
a device according to clause 22, the device being either a server or another docking station.

The invention claimed is:

1. A docking station comprising:
one or more inputs for connecting the docking station to one or more user devices;
one or more interfaces for connecting the docking station to one or more peripheral devices or a network;
a memory storing a set of docking station specific settings that are associated with the docking station; and
one or more processors configured to:
obtain identity information from a first user device connected to the docking station, the identity information indicating an identity of the first user device and an identity of a user associated with the first user device;
obtain a first configuration set of a plurality of configuration sets based at least in part on the identity information obtained from the first user device, the first configuration set indicating one or more settings, each associated with a respective peripheral device;
determine whether each of the one or more settings indicated by the first configuration set is relevant based at least in part on whether the peripheral device associated with the respective setting is connected to the docking station;
compare the first configuration set with the set of docking station specific settings; and
configure a set of peripheral devices connected to the docking station based at least in part on each setting, of the one or more settings, determined to be relevant and based at least in part on the comparison of the first configuration set with the set of docking station specific settings.

2. The docking station of claim 1, wherein each configuration set of the plurality of configuration sets is stored in association with one of a plurality of user devices or one of a plurality of user identities.

3. The docking station of claim 1, wherein the docking station is connected to a network and the plurality of configuration sets is stored at the docking station or at another device connected to the network.

4. The docking station of claim 1, wherein the one or more processors are further configured to:
obtain information regarding hardware available at the docking station or a network connection available at the docking station; and
configure the set of peripheral devices based at least in part on the hardware available at the docking station or the network connection available at the docking station.

5. The docking station of claim 1, wherein the set of docking station specific settings includes default settings to be applied at the docking station when the first user device connects to the docking station for a first time.

6. The docking station of claim 1, wherein the set of docking station specific settings comprises:
a height setting of a height-adjustable desk;
a temperature setting for a climate control unit;
a display setting that defines a logical arrangement of displays;
a window blind setting; or
a lighting setting.

7. The docking station of claim 1, wherein the one or more processors are further configured to:
obtain information regarding one or more capabilities of the first user device; and
configure the set of peripheral devices based at least in part on the one or more capabilities of the first user device.

8. The docking station of claim 1, wherein the first configuration set indicates a setting that defines:
a size or arrangement of an application window;
a logical arrangement of display panels;
a brightness or contrast of a display panel;
a configuration setting for an audio input device;
a configuration setting for an audio output device;
a configuration setting for a keyboard;
a configuration setting for a mouse;
a network configuration setting; or
a network security setting.

9. The docking station of claim 8, wherein the setting defines the logical arrangement of display panels, and the logical arrangement of display panels includes a display panel of the first user device.

10. The docking station of claim 1, wherein the one or more processors are further configured to:
receive, from the first user device, a request to change a setting of the one or more settings at the docking station; and
responsive to determining that the request to change a setting should be granted:
perform the requested setting change;
generate an updated configuration set; and
store the updated configuration set in association with the identity information at the docking station or transmit the updated configuration set to another device for storage thereon.

11. A device comprising:
one or more interfaces for connecting the device to a network; and
one or more processors configured to determine a setting to be applied at a docking station, the one or more processors configured to:
store, at the device, a plurality of configuration sets that each identify at least one setting associated with operation of the docking station;
receive, from the docking station, identity information indicating an identity of a user device and an identity of a user associated with the user device, the docking station being connected to the network;
determine whether the plurality of configuration sets includes a first configuration set that is associated with the identity information;
responsive to determining that the plurality of configuration sets includes the first configuration set:
transmit the first configuration set to the docking station via the network;
responsive to determining that the plurality of configuration sets does not include any configuration set that is associated with both the identity of the user device indicated by the identity information and the identity of the user indicated by the identity information:
  determine whether the plurality of configuration sets includes a configuration set that is associated with the user indicated by the identity information and is not associated with the identity of the user device indicated by the identity information;
  responsive to determining that the plurality of configuration sets includes only one configuration set that is associated with the user indicated by the identity information and is not associated with the identity of the user device indicated by the identity information:
    transmit, to the docking station, the configuration set that is associated with the user indicated by the identity information and is not associated with the identity of the user device indicated by the identity information.

12. The device of claim 11, wherein the one or more processors are further configured to:
  responsive to determining that the plurality of configuration sets includes a plurality of configuration sets that are associated with the user indicated by the identity information and are not associated with the identity of the user device indicated by the identity information:
    generate a combined configuration set using the plurality of configuration sets that are associated with the user indicated by the identity information and are not associated with the identity of the user device indicated by the identity information; and
    transmit the combined configuration set to the docking station.

13. The device of claim 12, wherein generation of the combined configuration set comprises calculating an average value of a numerical setting of the plurality of configuration sets that are associated with the user indicated by the identity information and are not associated with the identity of the user device indicated by the identity information.

14. A system comprising:
  a docking station; and
  a device configured to:
    store, at the device, a plurality of configuration sets that each identify at least one setting associated with operation of the docking station;
    receive, from the docking station, identity information indicating an identity of a user device and an identity of a user associated with the user device;
    determine whether the plurality of configuration sets includes a first configuration set that is associated with the identity information; and
    transmit the first configuration set to the docking station responsive to determining that the plurality of configuration sets includes the first configuration set;
  wherein the docking station stores a set of docking station specific settings that are associated with the docking station and configures a set of peripheral devices connected to the docking station based at least in part on a comparison of the first configuration set with the set of docking station specific settings.

15. The system of claim 14, wherein the docking station comprises:
  one or more inputs for connecting the docking station to one or more user devices;
  one or more interfaces for connecting the docking station to one or more peripheral devices or a network; and
  one or more processors configured to:
    obtain identity information from a first user device of the one or more user devices connected to the docking station; and
    obtain a first configuration set of a plurality of stored configuration sets based at least in part on the identity information, the first configuration set indicating one or more settings each associated with a respective peripheral device.

* * * * *